United States Patent [19]

Blättner et al.

[11] Patent Number: 4,706,370

[45] Date of Patent: Nov. 17, 1987

[54] CUTTING AND MOUNTING APPARATUS

[75] Inventors: Dietmar Blättner, Schwaikheim; Hermann Dieterle, Esslingen; Manfred Leutwein, Kernen; Horst Simon, Fellbach, all of Fed. Rep. of Germany

[73] Assignee: Eastman Kodak Company, Rochester, N.Y.

[21] Appl. No.: 871,418

[22] PCT Filed: Oct. 4, 1985

[86] PCT No.: PCT/DE85/00363

§ 371 Date: May 28, 1986

§ 102(e) Date: May 28, 1986

[87] PCT Pub. No.: WO86/02178

PCT Pub. Date: Apr. 10, 1986

[30] Foreign Application Priority Data

Oct. 5, 1984 [DE] Fed. Rep. of Germany ....... 3436538

[51] Int. Cl.[4] .............................................. B23Q 7/00

[52] U.S. Cl. .................................. 29/564.2; 29/566.1; 53/520; 83/153; 83/167

[58] Field of Search ................. 83/153, 167; 29/33 K, 29/33.2, 564, 564.1, 564.2, 564.6, 566, 566.1; 53/520, 435

[56] References Cited

U.S. PATENT DOCUMENTS

| | | | |
|---|---|---|---|
| 3,248,846 | 5/1966 | Engelstein | 53/123 |
| 3,274,665 | 9/1966 | Higginson et al. | 29/33 |
| 3,707,755 | 1/1973 | Petterson | 29/200 B |
| 3,780,608 | 12/1973 | Brown | 83/375 |
| 3,822,460 | 7/1974 | Rinehuls | 29/564.6 |
| 3,992,243 | 11/1976 | Berggren et al. | 156/521 |
| 3,996,683 | 12/1976 | Hanke | 40/158 B |
| 4,172,003 | 10/1979 | Bachelder et al. | 156/517 |
| 4,237,678 | 12/1980 | Thompson | 29/564.6 |
| 4,256,527 | 3/1981 | Green | 156/443 |
| 4,395,144 | 7/1983 | Adams et al. | 29/33 K |
| 4,395,819 | 8/1983 | Thompson | 29/33 K |
| 4,461,105 | 1/1984 | Thebault | 40/152 |
| 4,561,167 | 12/1985 | Saito | 29/564.6 |

FOREIGN PATENT DOCUMENTS 0009144 8/1979 European Pat. Off. .

*Primary Examiner*—Gil Weidenfeld
*Assistant Examiner*—Daniel Howell
*Attorney, Agent, or Firm*—Robert L. Randall

[57] ABSTRACT

In a cutting and mounting apparatus for cutting a film section (9) which can be lowered into a slide mount (10) positioned below a cutting tool (5) in a slider (7), and which upon withdrawal of slider (7) can be snapped into the slide mount (10) while resting agaisnt a guiding jaw (**2*a*), a component (12), shiftably guided on the slider (7), is designed as a U-shaped resilient clamp enclosing the rear area of the slider (7). The component (12) comprises guiding elements (12*b*) which point in the direction of movement of the slider (7), and are formed by tongues pointing upwardly at an angle, seizing the rear edge of a bent film section (9) when the slider (7) has been partly extended, and deflecting said rear edge so that it snaps into the groove-shaped recess in the rear frame portion (10*b*) of slide mount (10). When the slider (7) has been retracted, the component (12) is in a first position in which it extends beyond the rear frame portion (10*b*) of slide mount (10) while resiliently resting thereon, whereas when the slider (7) is extended the component (12) is in a second position in which it releases the rear frame portion (10*b*) of slide mount (10**).

5 Claims, 5 Drawing Figures

CUTTING AND MOUNTING APPARATUS

Figure 1:
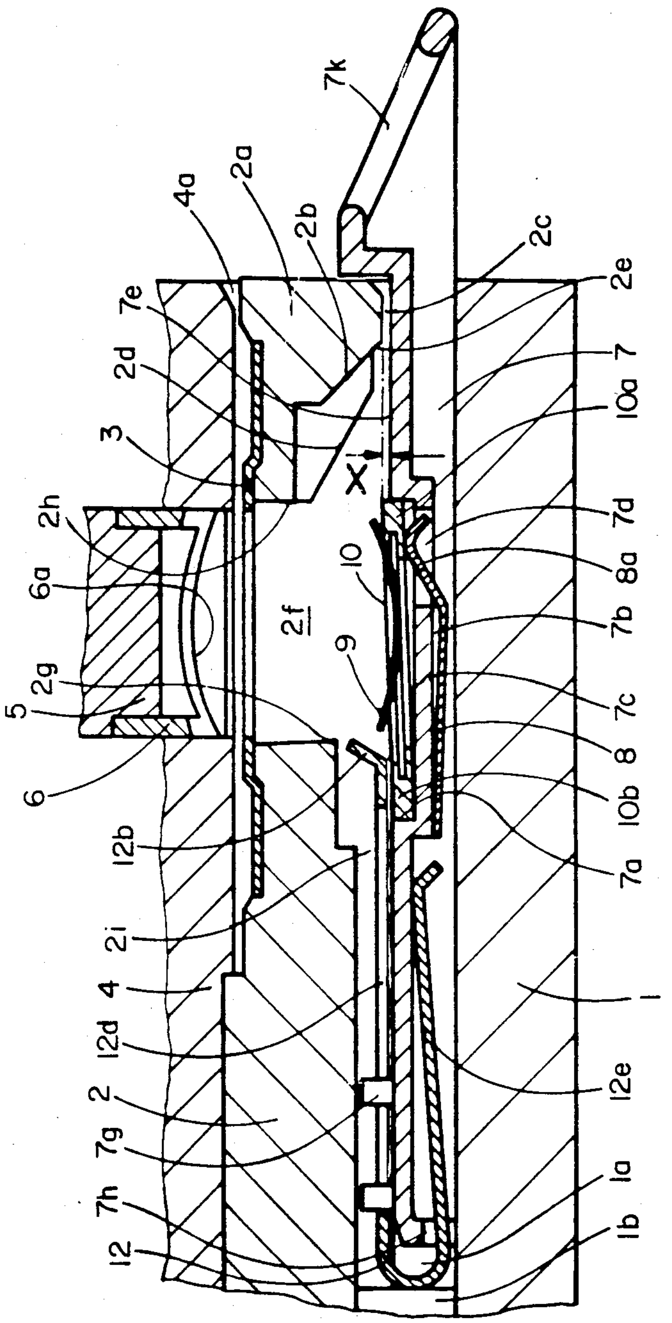

The invention relates to a cutting and mounting apparatus for cutting film sections which can be lowered into a slide mount disposed in a slider below a cutting tool, and which upon withdrawal of said slider can be snapped into the slide mount while resting against a guiding jaw, said apparatus also having means for holding the slide mount in the slider and for seizing one of the film sections each.

From EP-PS No. 0 009 144, a cutting and mounting apparatus is known in the case of which a slide film section can be snapped into a common-type slide mount. This apparatus comprises a slide mount shifting means and has two convex bending jaws facing each other at a distance defined by a slide film section. Each bending jaw is designed on an abutment and has an impact surface facing downwardly. Both abutments are pivotable and spring-biased so as to rest on the front and rear frame portion, respectively, of a slide mount shiftable below the abutments. The rear abutment is pivotally arranged in a guide block which can be shited in the longitudinal direction by means of a slider connected to it by a spring so that during a first phase of movement of the shifting means the rear abutment can be moved over a certain distance towards the stationarily and pivotally mounted front abutment across the surface of the slide mount. During this shifting movement, the rear edge of the film section is seized by the impact surface of the bending jaw of the rear abutment and shifted forwardly. During said shifting movement, the film section first engages with its rear edge the area of a groove at the rear frame portion of the slide mount, and then abuts with its front edge the impact surface of the front bending jaw. After the rear abutment has been shifted over a short distance, the slide mount starts shifting and is first slid with its front frame portion below the front abutment. Since the film section is supported with its rear edge in the groove of the rear frame portion and rests with its front edge against the impact surface of the front bending jaw, the central area of the film section bends upwardly upon further shifting of the slide mount and snaps into a groove in the front frame portion of the slide mount.

In the case of bigger film sections, e.g. in the case of a slide of a greater format, or of film sections having the size of a slide, which are punched out of a film strip (West German Patent Application P No. 34 03 027), the film section or cut-out can be bent in various directions, with the extent to which the section or cut-out is bent varying greatly.

The apparatus mentioned first is not suitable for snapping in a greatly bent film section or cut-out since the upwardly facing edges of a greatly bent film section come to rest on the convex bending jaws of the two abutments of the known apparatus and are deflected upwardly so that they can no longer be seized by the impact edges of the abutments. If the rear abutment moved towards the front abutment, the film section would be compressed between them and thus become useless. Moreover, inspite of the chute walls being inclined a film section when cut and lowered into a slide mount could get stuck with one of its edges in the area of one of the convex transition points of the bending jaws, and could remain in an angular position. In addition to a number of movable parts, the abutments are pivotally movable, too, so that the known shifting means has a complicated construction and can only be manufactured at high costs.

It is the object of the invention to modify and to improve the shifting means of the known cutting and mounting apparatus such that pivotally movable components are not necessary for holding down a slide mount, and that despite a simple construction of the apparatus the shifting means functions reliably so that particularly the edges of greatly bent film sections are seized with adequate reliability and directed into the area of the frame portions of a slide mount.

According to the invention, this object is achieved in that a component is shiftably guided on the slider, that the component is provided with guiding elements pointing in the direction of extension of the slider, and in that when the slider is retracted, the component resiliently rests against the rear frame portion of the slide mount and extends beyond it, and when the slider is extended, releases the rear frame portion of the slide mount in a second position.

Other features and advantages can be inferred from the subclaims, and from the description of an embodiment of the invention illustrated in the drawing.

In the drawings

Figure 2:
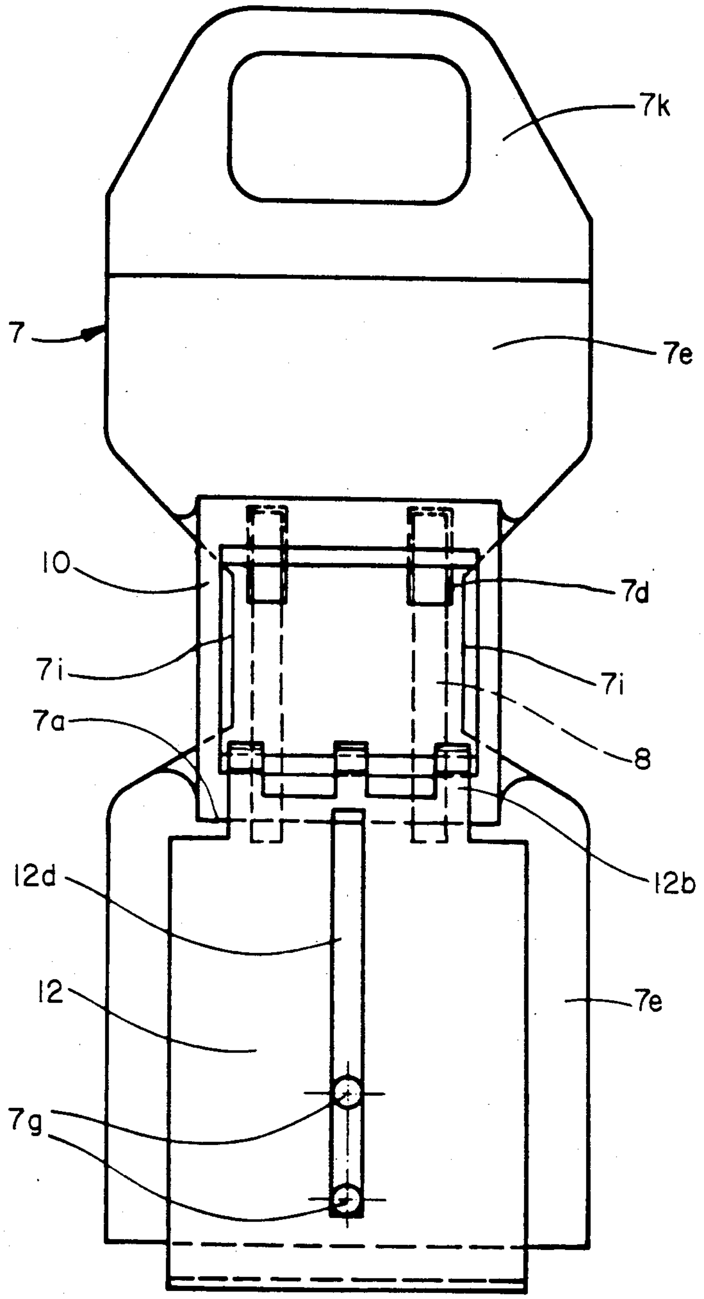

FIG. 1 is a sectional side view of part of the cutting and mounting apparatus with a shifting means in a first functional position, FIG. 2 is a plan view of the slider of the shifting means according to FIG. 1, and FIGS. 3 to 5 are sectional side views of the apparatus according to FIG. 1 with the shifting means in various functional positions.

A base plate 1 includes a guide channel 1*a* (FIGS. 1 and 4) for a slide member or slider 7. The guide channel 1*a* is covered by a cover plate 2 arranged on the base plate 1 and serving to support a cutting plate 3.

The slider 7 is easily shiftable. A tool guide 4 is placed on top of the cover plate 2. In said guide, a cutter block 6 of a tool 5 is guided, which has four cutting blades 6*a*. Reference numeral 4*a* relates to a gap between the cutting plate 3 and the tool guide 4. Into this gap, a film can be slid, off which a film section 9 is to be cut. The film section 9 can be lowered down a chute 2*f* which is provided downstream of the cutting plate 3 in the cover plate 2 and has walls slightly inclined inwardly. The film section 9 reaches a common-type slide mount 10 which is located below the chute end and is suitable for film sections to be snapped into.

The slide mount 10 is positioned in an indentation 7*a* of slider 7. The position of the indentation 7*a* is chosen such that when the slider 7 has been retracted, the rear edge of the upper greater gate opening of slide mount 10 lies behind the lower edge 2*g* of the rear wall of the chute. The front frame portion 10*a* of the slide mount 10 is located within the chute at the front end thereof. The two lateral edges of the upper greater gate opening of slide mount 10 are substantially aligned with the two lateral edges of the chute end.

That part of cover plate 2, which is located in the direction of extension of slider 7, is designed as a rigid guiding jaw 2*a*. It has a wall 2*b* which projects from the front chute wall 2*h* downwardly at a substantially inclined position and turns into the lower side 2*c*. Two laterally arranged, inclined ribs 2*d* are provided on the wall 2*b*, the lower end faces of said ribs being offset with respect to the lower side 2*c* of the guiding jaw 2*a* so that a downwardly projecting abutment edge 2*e* is formed. A narrow gap "X" exists between the upper side 7*e* of slider 7 and the lower side 2*c* of the guiding jaw 2*a*.

In order to be able, when the slider 7 has been extended (FIG. 5), to remove without difficulty a slide mount 10 positioned in the indentation 7*a* and to insert another slide mount, the lateral walls of slider 7 are provided with trapezoidal recesses 7*i* in the area of said indentation 7*a*, as shown in FIG. 2. The front end of slider 7 comprises a handle 7*k*.

Figure 3:
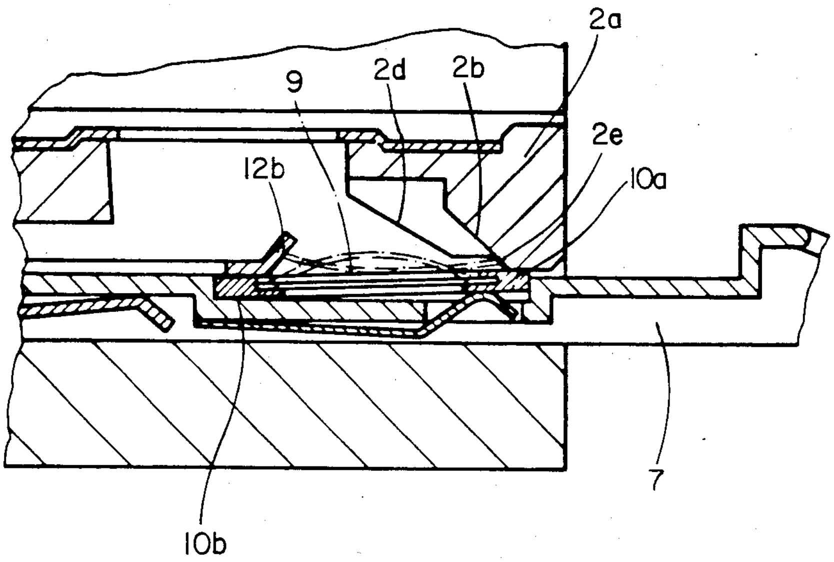

Two springs 8 are arranged in a recess 7*b* in the lower side of the slider, with the free ends 8*a* of said springs, pointing in the direction of extension of slider 7, projecting through two openings 7*d* in the bottom surface 7*c* of slider 7. The openings 7*d* are located in the area of the front frame portion 10*a* of slide mount 10, said portion lying in the direction of extension of the slider. The free ends 8*a* of the springs 8 are spring-biased so as to rest against the front frame portion 10*a* of slide mount 10 and lift said slide mount at one end by at least the width "X" of the gap between the upper side 7*e* of the slider 7 and the lower side 2*c* of the guiding jaw 2*a*. When the slider 7 is extended, this leads to the front area of the upper side of slide mount 10 being spring-biased so as to rest free from play against the lower side 2*c* of the guiding jaw 2*a* (FIG. 3). This ensures that the front edge of a film section 9 fully abuts the edge 2*e* of the guiding jaw 2*a* which is rigid and forms an integral unit with the cover plate 2. FIG. 3 shows how the cut-out film section can be bent in various directions.

In order that on the one hand the slide mount 10 lifted at one end maintains its position in the indentation 7*a* of slider 7 when said slider 7 is extended, and that on the other hand a bent film section 9 is seized at its rear edge with adequate reliability and deflected into the groove-shaped recess in the rear frame portion 10*b* of slide mount 10 when the slider 7 is extended, the slider 7 comprises a shiftable component 12 having a guiding element 12*b* which points in the direction of extension of slider 7. The component is designed as a resilient clamp and encloses the rear area of slider 7 with a bent-off spring arm 12*e* of component 12 extending through an opening 7*h* in the rear end face of slider 7 and resiliently resting on the inner wall of slider 7.

The component 12 has a guiding slot 12*d* extending in the longitudinal direction. Two guiding pins 7*g* molded on the upper side 7*e* of slider 7 project through said slot so that the component 12 is guided on the slider 7. The guiding element 12*b* arranged on the component 12 is formed by three tongues as fingers which point upwardly at an angle. Both the pins 7*g* projecting through the guiding slot 12*d* in the component 12, and the guiding elements 12*b* project into a recess 2*i* in the lower side of cover plate 2, said recess corresponding substantially to the width of component 12.

The apparatus has the following mode of operation: When the slider 7 has been retracted into the apparatus (FIG. 1), the component 12 rests against a stop 1*b* in the guide channel 1*a*. As has already been described above, the component encloses the rear area of slider 7 and is in its first position in which it extends beyond the rear frame portion 10*b* of slide mount 10 while resiliently resting thereon. In this position, the upwardly pointing ends of the guiding elements 12*b* are in alignment with the lower edge 2*g* of the rear chute wall of cover plate 2 (FIG. 1), or they lie slightly behind the lower edge 2*g*.

As can be seen from FIG. 3, the front edge of the film section 9 first strikes against the abutment edge 2*e* of the guiding jaw 2*a* when slider 7 is extended. As, upon extension of slider 7, the clamped component 12 moves along, too, the rear edge of the film section 9 which rests against the abutment edge 2*e* is seized by the upwardly pointing tongues of the guiding elements 12*b* as described above, is deflected in the direction of the groove in the rear frame portion 10*b* of slide mount 10 and slid into said groove, as can be seen in dash-dotted lines in FIG. 3. Subsequently, the film section 9 is bent upwardly along the inclined ribs 2*d* of the guiding jaw 2*a* and snaps into the groove in the front frame portion 10*a* of slide mount 10.

Figure 4:
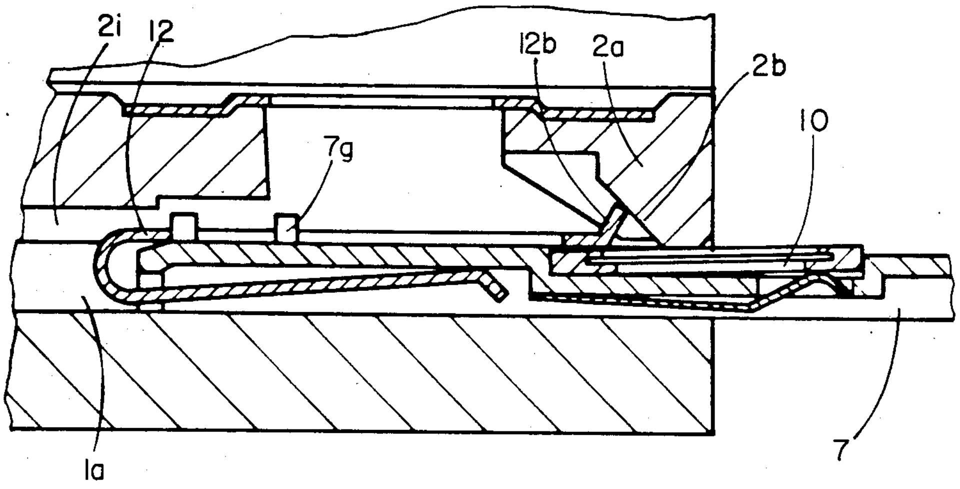
Figure 5:
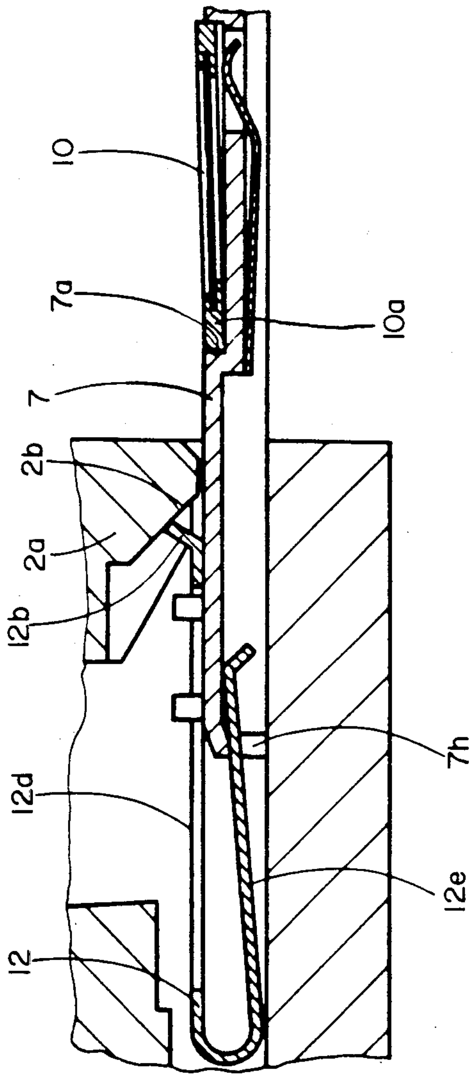

Upon further extension of the slider 7, the component 12 rests via its guiding elements 12*b* against the wall 2*b* of the guiding jaw 2*a* and is retained, as shown in FIGS. 4 and 5. Subsequently, the slider can be fully extended as a function of the free length of the guiding slot 12*d* in the component 12 (FIG. 5). Now, the component 12 is in its second position in which it releases the rear frame portion 10*a* of the slide mount 10 fed out by the slider 7. The slide mount 10 complete with the film section 9 can now be removed from the slider 7 without difficulty, and an empty slide mount can be inserted. Upon retraction of the slider 7, the component 12 first abuts the stop 1*b* (FIG. 1). Then, the slider 7 can be fully retracted as a function of the free length of the guiding slot 12*d* when the component 12 rests against the stop 1*b*. The component 12 is once again in its first position in which it encloses the rear area of slider 7, the guiding elements 12*b* extending beyond the rear frame portion 10*b* of the freshly inserted, empty slide mount 10 while resiliently resting thereon.

We claim:

1. In a cutting and mounting apparatus for cutting a film section which is then lowered into a slide mount, said apparatus comprising a cutting tool including a cutting plate disposed in a cover plate, a slide member disposed in a guide channel beneath the cover plate, said slide member being provided with a recess in the upper surface thereof for receiving a slide mount, said slide member being arranged to move between a first position wherein the slide mount is disposed in alignment with and beneath said cutting plate and a second position wherein the slide mount is disposed exteriorly of said apparatus, and a guiding jaw member disposed between said cutting plate and said slide member and arranged to engage a film section disposed on the upper surface of a slide mount carried by said slide member so that, as the slide member is moved in said guide channel to withdraw the slide mount from the apparatus, said film section is engaged and deflected by said guiding jaw member and is snapped into said slide mount, the improvement comprising a resilient clip component shiftably mounted on the trailing end of said slide member, said clip component being provided with guiding finger elements pointing in the direction of movement of the slide member to the second position, said clip component arranged so that when the slide member is in the first position the finger elements resiliently rest on the trailing edge of said slide mount and when the slide member is in the second position the finger elements release the slide mount.

2. The invention according to claim 1 wherein said clip component is a substantially U-shaped element that wraps around the trailing edge of said slide member and said finger elements are arranged to engage said guiding jaw member when said slide member is moved toward said second position.

3. The invention according to claim 2 wherein said clip component is arranged to slide on said slide member.

4. The invention according to claim 3 wherein said guide channel is provided with a stop which is arranged to return said clip component to the position to engage said end of said slide mount when said slide member is returned to said first position.

5. The invention according to claim 1 wherein said finger elements are arranged to point upwardly at an angle thereby engaging an edge of a film section when the slide member is moved from said first position toward said second position to deflect said film section into said slide mount.

* * * * *